United States Patent
Miyamoto et al.

(10) Patent No.: US 7,084,233 B2
(45) Date of Patent: Aug. 1, 2006

(54) AROMATIC POLYCARBONATE, PROCESS FOR PRODUCING THE SAME, POLYCARBONATE COMPOSITION, AND HOLLOW CONTAINER OBTAINED FROM THE SAME

(75) Inventors: Masaaki Miyamoto, Fukuoka (JP); Takao Tayama, Fukuoka (JP); Hiroshi Nakano, Kanagawa (JP)

(73) Assignees: Mitsubishi Chemical Corporation, Tokyo (JP); Mitsubishi Engineering-Plastics Corporation, Tokyo (JP)

(*) Notice: Subject to any disclaimer, the term of this patent is extended or adjusted under 35 U.S.C. 154(b) by 0 days.

(21) Appl. No.: 10/813,042

(22) Filed: Mar. 31, 2004

(65) Prior Publication Data

US 2004/0260049 A1 Dec. 23, 2004

Related U.S. Application Data

(63) Continuation of application No. PCT/JP03/04570, filed on Apr. 10, 2003.

(30) Foreign Application Priority Data

Apr. 22, 2002 (JP) .................. P. 2002-119514
Nov. 20, 2002 (JP) .................. P. 2002-337099

(51) Int. Cl.
*C08G 64/00* (2006.01)

(52) U.S. Cl. .................. 528/196; 428/34.1; 428/35.7; 528/164; 528/176; 528/193; 528/198

(58) Field of Classification Search .............. 428/34.1, 428/35.7; 528/196, 198, 176, 193, 194
See application file for complete search history.

(56) References Cited

U.S. PATENT DOCUMENTS

| 3,525,712 A | 8/1970 | Kramer |
| 3,544,514 A | 12/1970 | Schnell et al. |
| 4,001,184 A | 1/1977 | Scott |
| 5,367,044 A | 11/1994 | Rosenquist |
| 5,948,876 A * | 9/1999 | Mestanza et al. ........... 528/196 |
| 6,166,167 A | 12/2000 | Miyamoto et al. |
| 6,262,210 B1 * | 7/2001 | Tojo et al. .................. 526/270 |
| 6,288,205 B1 | 9/2001 | Miyamoto et al. |
| 6,294,641 B1 | 9/2001 | Miyamoto et al. |
| 6,613,869 B1 | 9/2003 | Horn et al. |
| 6,750,314 B1 | 6/2004 | Miyamoto et al. |

FOREIGN PATENT DOCUMENTS

| EP | 0 411 433 | 2/1991 |
| EP | 1 083 193 A1 | 3/2001 |
| EP | 1 369 446 A1 | 12/2003 |
| JP | 44-17149 | 7/1969 |
| JP | 47-23918 | 7/1972 |
| JP | 60-11733 | 3/1985 |
| JP | 06248067 * | 9/1994 |
| JP | 9-286850 | 11/1997 |
| JP | 2000-25730 | 1/2000 |
| JP | 2000 063507 * | 2/2000 |
| JP | 2000-159880 | 6/2000 |
| WO | WO 01/19892 | 3/2001 |
| WO | WO 03/057758 A1 | 7/2003 |

* cited by examiner

*Primary Examiner*—Terressa Boykin
(74) *Attorney, Agent, or Firm*—Oblon, Spivak, McClelland, Maier & Neustadt, P.C.

(57) ABSTRACT

A subject for the invention is to provide a branched aromatic polycarbonate which is excellent in hue and in melt characteristics such as melt strength.

The invention provides a branched aromatic polycarbonate having a viscosity-average molecular weight of 16,000 or higher obtained by the transesterification method, characterized in that the ratio of the weight-average molecular weight (Mw) to number-average molecular weight (Mn) as measured by gel permeation chromatography and calculated for standard polystyrene (Mw/Mn) is in the range of from 2.8 to 4.5 and that the proportion of the number of moles of all structural units yielded by a rearrangement reaction in the course of melt polymerization reaction to 1 mol of structural units having the framework of an aromatic dihydroxy compound used as a starting material is higher than 0.3 mol % and not higher than 0.95 mol.

21 Claims, No Drawings

AROMATIC POLYCARBONATE, PROCESS FOR PRODUCING THE SAME, POLYCARBONATE COMPOSITION, AND HOLLOW CONTAINER OBTAINED FROM THE SAME

TECHNICAL FIELD

The present invention relates to a branched aromatic polycarbonate of excellent quality and a process for producing the same. More particularly, the invention relates to a branched aromatic polycarbonate which has improved flowability under high load and a satisfactory hue and is hence suitable for use in processing by extrusion and injection molding, especially in applications such as hollow parts formed by blow molding, which necessitates a material having high melt strength and giving an extrudate with excellent shape retention, large panels, and sheets formed by profile extrusion, and to a process for producing the polycarbonate.

BACKGROUND ART

Known processes for producing a polycarbonate (hereinafter referred to as PC) include a process in which an aromatic dihydroxy compound such as a bisphenol is directly reacted with phosgene (interface method) and a process in which an aromatic dihydroxy compound such as a bisphenol and a carbonic diester such as diphenyl carbonate are subjected to a transesterification reaction in a molten state (transesterification method or melt method). With respect to linear PC's among the PC's obtained by such processes, there generally is room for improvement in molding properties such as melt elasticity and melt strength. For improving such molding properties, several techniques have been proposed which comprise copolymerizing a polyfunctional organic compound to form a branched PC (see, for example, patent documents 1 to 3).

In the case where such a branched PC is produced by the melt method using a branching agent heretofore in use in the interface method, the branched PC obtained has a problem that the branching agent undergoes decomposition, etc. at high temperatures and this not only makes it impossible to obtain the desired melt characteristics but results in an impaired hue. This branched PC has not been a commercial product. There has hence been a desire for a branched aromatic polycarbonate which has improved flowability under high load and a satisfactory hue and is hence suitable for use in processing by extrusion and injection molding, especially in applications such as hollow parts formed by blow molding, which necessitates a material having high melt strength and giving an extrudate with excellent shape retention, large panels, and sheets formed by profile extrusion.

[Patent Document 1]
JP-B-44-17149
[Patent Document 2]
JP-B-47-23918
[Patent Document 3]
JP-B-60-11733

The invention provides a branched aromatic polycarbonate of excellent quality and a process for producing the same. More particularly, the invention provides a branched aromatic polycarbonate which has improved flowability under high load and a satisfactory hue and is hence suitable for use in processing by extrusion and injection molding, especially in applications such as hollow parts formed by blow molding, which necessitates a material having high melt strength and giving an extrudate with excellent shape retention, large panels, and sheets formed by profile extrusion. The invention further provides a process for efficiently producing this branched aromatic polycarbonate.

DISCLOSURE OF THE INVENTION

The present inventors made intensive investigations in order to provide a branched aromatic polycarbonate which has a satisfactory color tone and retains intact melt characteristics. As a result, they have found that a branched aromatic polycarbonate which has a molecular-weight distribution within a specific range and contains in the main chain specific structural units in a specific amount has excellent melt characteristics and a satisfactory color tone. The invention has been thus completed.

Namely, an essential aspect of the invention resides in an aromatic polycarbonate having a viscosity-average molecular weight of 16,000 or higher obtained by the transesterification method, characterized in that the ratio of the weight-average molecular weight (Mw) to number-average molecular weight (Mn) as measured by gel permeation chromatography and calculated for standard polystyrene (Mw/Mn) is in the range of from 2.8 to 4.5 and that the proportion of the number of moles of all branched structural units to 1 mol of structural units represented by general formula (1) is higher than 0.3 mol % and not higher than 0.95 mol %:

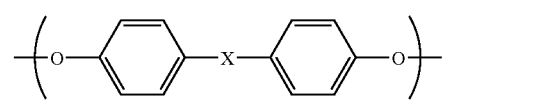

formula (1)

(wherein X is a member selected from the group consisting of a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, and bivalent groups represented by —O—, —S—, —CO—, —SO—, and —SO$_2$—).

Another essential aspect of the invention resides in an aromatic polycarbonate having a viscosity-average molecular weight of 16,000 or higher obtained by the transesterification method, characterized in that the ratio of the viscosity-average molecular weight (Mv) calculated using the following formula (2) to the number-average molecular weight (Mn') calculated from the number of all molecular ends (Mv/Mn') is in the range of from 1.8 to 3.5 and that the proportion of the number of moles of all branched structural units to 1 mol of structural units represented by general formula (1) is higher than 0.3 mol % and not higher than 0.95 mol %:

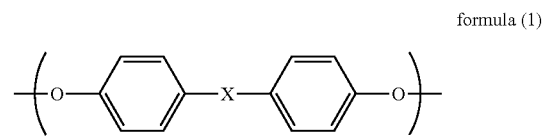

formula (1)

$\eta_{sp}/C = [\eta] \times (1 + 0.28\eta_{sp})$ $[\eta] = 1.23 \times 10^{-4} \times (Mv)^{0.83}$      formula (2)

(wherein $\eta_{sp}$ is the specific viscosity of a methylene chloride solution of the polycarbonate resin as measured at 20° C. and C is the concentration of this methylene chloride solution, the methylene chloride solution being one having a polycarbonate resin concentration of 0.6 g/dl).

Still another essential aspect of the invention resides in a process for producing the aromatic polycarbonate described above by reacting one or more carbonic diesters with one or more aromatic dihydroxy compounds, characterized in that at least one alkali metal compound and/or at least one alkaline earth metal compound is used in producing the aromatic polycarbonate in an amount of from 1.1 to 6 μmol in terms of metal amount per mole of the aromatic dihydroxy compounds.

A further essential aspect of the invention resides in an aromatic polycarbonate composition which comprises the aromatic polycarbonate described above and a carbonic diester compound, wherein the content of the carbonic diester compound is 200 ppm by weight or lower.

Still a further essential aspect of the invention resides in an aromatic polycarbonate composition which comprises the aromatic polycarbonate described above and a dye, wherein the dye comprises one or more compounds selected from Phthalocyanine Blue dyes and anthraquinone dyes, the content of the dye being from 0.01 ppm by weight to 100 ppm by weight.

Still a further essential aspect of the invention resides in a hollow container obtained by the blow molding of the aromatic polycarbonate or aromatic polycarbonate composition described above.

BEST MODE FOR CARRYING OUT THE INVENTION

The invention will be explained below in detail.

Process for Producing Branched Aromatic Polycarbonate:

The branched aromatic polycarbonate of the invention, which may substantially contain a polyester carbonate or polyarylate, can be obtained by subjecting an aromatic dihydroxy compound and a carbonic diester as starting materials to melt polycondensation in the presence of a transesterification catalyst.

Carbonic Diester:

The carbonic diester to be used in the invention is represented by the following general formula (14).

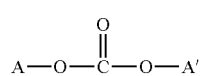

formula (14)

(In formula (14), A and A' are an aliphatic or substituted aliphatic group having 1 to 18 carbon atoms or an aromatic or substituted aromatic group, provided that A and A' may be the same or different.)

Examples of the carbonic diester represented by general formula (14) include dialkyl carbonate compounds such as dimethyl carbonate, diethyl carbonate, and di-t-butyl carbonate, diphenyl carbonate, and substituted diphenyl carbonates such as ditolyl carbonate. Preferred are diphenyl carbonate and substituted diphenyl carbonates. Especially preferred is diphenyl carbonate. These carbonic diesters may be used alone or as a mixture of two or more thereof.

Dicarboxylic acids or dicarboxylic acid esters may be used together with one or more carbonic diesters such as those shown above, in an amount of preferably 50% by mole or smaller, more preferably 30% by mole or smaller. As the dicarboxylic acids or dicarboxylic acid esters may be used terephthalic acid, isophthalic acid, diphenyl terephthalate, diphenyl isophthalate, and the like. When such a dicarboxylic acid or dicarboxylic acid ester is used in combination with one or more carbonic diesters, a polyester carbonate is obtained.

Aromatic Dihydroxy Compound:

The aromatic dihydroxy compound to be used in the invention is generally represented by the following general formula (15).

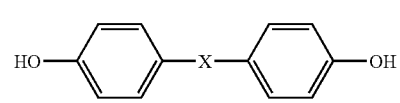

formula (15)

(In formula (15), X is a member selected from the group consisting of a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, and bivalent groups represented by —O—, —S—, —CO—, —SO—, and —SO$_2$—.)

Examples of the aromatic dihydroxy compound represented by general formula (15) include 2,2-bis(4-hydroxyphenyl)propane (also called "bisphenol A"), bis(4-hydroxyphenyl)sulfone, sulfone, bis(4-hydroxyphenyl)sulfide, bis(4-hydroxyphenyl)ether, and bis(4-hydroxyphenyl)ketone. Especially preferred examples thereof include bisphenol A. These aromatic dihydroxy compounds may be used alone or as a mixture of two or more thereof.

For producing an aromatic polycarbonate in the invention, bisphenol A and diphenyl carbonate are generally used as the aromatic dihydroxy compound and the carbonic diester, respectively. It is preferred that diphenyl carbonate be used in an amount of from 1.01 to 1.30 mol, preferably from 1.02 to 1.20 mol, per mol of the bisphenol A. Molar proportions thereof smaller than 1.01 are undesirable because the aromatic polycarbonate thus produced has an increased amount of terminal OH groups and hence impaired thermal stability. Molar proportions thereof larger than 1.30 are undesirable because not only the rate of transesterification reaction conducted under the same conditions becomes low to make it difficult to produce an aromatic polycarbonate resin having a desired molecular weight, but also the aromatic polycarbonate produced contains the carbonic diester remaining in an increased amount and this residual carbonic diester is causative of odor emission during molding or from the molded objects.

Transesterification Catalyst:

At least one alkali metal compound and/or at least one alkaline earth metal compound is used as a transesterification catalyst in the invention. Although a basic compound such as, e.g., a basic boron compound, basic phosphorus compound, basic ammonium compound, or amine compound can also be used as an aid, it is especially preferred to use at least one alkali metal compound and/or at least one alkaline earth metal compound alone.

Examples of the alkali metal compound include sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium tetraphenylboron, potassium tetraphenylboron, lithium tetraphenylboron, cesium tetraphenylboron, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, alcoholates or phenolates of sodium, potassium, lithium, and cesium, and the disodium salt, dipotassium salt, dilithium salt, and dicesium salt of bisphenol A.

Examples of the alkaline earth metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

Examples of the basic boron compound include the sodium salts, potassium salts, lithium salts, calcium salts, barium salts, magnesium salts, or strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, and butyltriphenylboron.

Examples of the basic phosphorus compound include triethylphosphine, tri-n-propylphosphine, triisopropylphosphine, tri-n-butylphosphine, triphenylphosphine, tributylphosphine, and quaternary phosphonium salts.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

For obtaining a branched aromatic polycarbonate of the invention which is excellent in melt characteristics and hue, at least one alkali metal compound and/or at least one alkaline earth metal compound is used as a transesterification catalyst in an amount in the range of from 1.1 to 6 µmol in terms of metal amount per mole of the bisphenol A. The catalyst amount is preferably in the range of from 1.2 to 5 µmol, more preferably in the range of from 1.3 to 4 µmol, especially preferably in the range of from 1.3 to 3.8 µmol. In case where the catalyst amount is smaller than the lower limit, the polymerization activity necessary for producing a polycarbonate having a desired molecular weight and the branched-component amount which brings about melt characteristics cannot be obtained. In case where the catalyst amount is larger than the upper limit, the resultant polymer has an impaired hue and shows reduced flowability because of too large an amount of a branched component. Namely, the target branched aromatic polycarbonate having excellent melt characteristics cannot be produced. In addition, the amount of foreign particles increases due to gelation.

The transesterification reaction is generally conducted in two or more steps. Specifically, the first stage reaction may be conducted at a temperature of from 140 to 260° C., preferably from 180 to 240° C., for a period of from 0.1 to 10 hours, preferably from 0.5 to 3 hours. The reaction temperature is elevated while gradually lowering the pressure of the reaction system. Finally, the polycondensation reaction is conducted at a reduced pressure of 200 Pa or lower at a temperature of from 240 to 320° C. The final polymerizer to be used here preferably is a horizontal one. The reaction temperature in the final horizontal polymerizer is preferably in the range of from 280 to 300° C., more preferably in the range of from 282 to 300° C.

The residence time in the final horizontal polymerizer is preferably in the range of from 50 to 140 minutes, more preferably in the range of from 60 to 130 minutes. The type of reaction operation may be any of the batch process, continuous process, and a combination of the batch process and continuous process. However, the continuous process is especially preferred.

Branched Aromatic Polycarbonate:

The branched aromatic polycarbonate of the invention should have a viscosity-average molecular weight of 16,000 or higher. The viscosity-average molecular weight thereof is preferably 20,000 or higher, more preferably 24,000 or higher. Branched aromatic polycarbonates having a viscosity-average molecular weight lower than 16,000 are undesirable because the mechanical strength thereof, such as impact resistance, is low.

The amount of terminal OH groups in the branched aromatic polycarbonate considerably influences the thermal stability, hydrolytic resistance, hue, and other properties of products. For maintaining practical properties, the amount of terminal OH groups should be in the range of from 100 to 1,500 weight ppm of the branched aromatic polycarbonate, and is preferably in the range of from 150 to 1,200 ppm, more preferably in the range of from 200 to 1,000 ppm. Terminal OH group amounts smaller than 100 ppm are undesirable because the polycarbonate immediately after polymerization contains a large amount of the carbonic diester compound and it is difficult to reduce the carbonic diester compound amount to 200 weight ppm or smaller by removal by volatilization.

The branched aromatic polycarbonate of the invention is an aromatic polycarbonate obtained by the transesterification method and having a viscosity-average molecular weight of 16,000 or higher. One of the features thereof resides in that the ratio of the weight-average molecular weight (Mw) to number-average molecular weight (Mn) as measured by gel permeation chromatography and calculated for standard polystyrene (Mw/Mn) is in the range of from 2.8 to 4.5. This value indicates that the molecular-weight distribution of the branched aromatic polycarbonate is relatively broad.

As an index to molecular-weight distribution other than (Mw/Mn) is used the ratio of the viscosity-average molecular weight (Mv) calculated using the following formula (2) to the number-average molecular weight (Mn') calculated from the number of all molecular ends (Mv/Mn'). That the value of (Mw/Mn) is in the range of from 2.8 to 4.5 almost corresponds to that the value of (Mv/Mn') is in the range of from 1.8 to 3.5.

$$\eta_{sp}/C=[\eta]\times(1+0.28\eta_{sp})$$

$$[\eta]=1.23\times10^{-4}\times(Mv)^{0.83} \quad \text{formula (2)}$$

(In formula (2), $\eta_{sp}$ is the specific viscosity of a methylene chloride solution of the polycarbonate resin as measured at 20° C. and C is the concentration of this methylene chloride solution. The methylene chloride solution to be used is one having a polycarbonate resin concentration of 0.6 g/dl.) It is further necessary that the proportion (mol %) of the number of moles of all branched structural units to 1 mol of the structural units represented by general formula (1) should be in the range of from 0.3 to 0.95, excluding 0.3. As long as those relationships are satisfied, one which has high melt tension and satisfactory suitability for blow molding and is satisfactory also in thermal stability and color tone is obtained. In case where the values of Mw/Mn and Mv/Mn' and the degree of branching are lower than the lower limits of the ranges shown above, melt tension is not obtained and the target branched aromatic polycarbonate having excellent melt characteristics tends to be unable to be produced. In case where these are higher than the upper limits of the ranges shown above, the results are too high a melt tension and poor flowability and the target branched aromatic polycarbonate having excellent melt characteristics tends to be unable to be produced.

Examples of the branched structural units typically are structures represented by the following formulae (3) to (6).

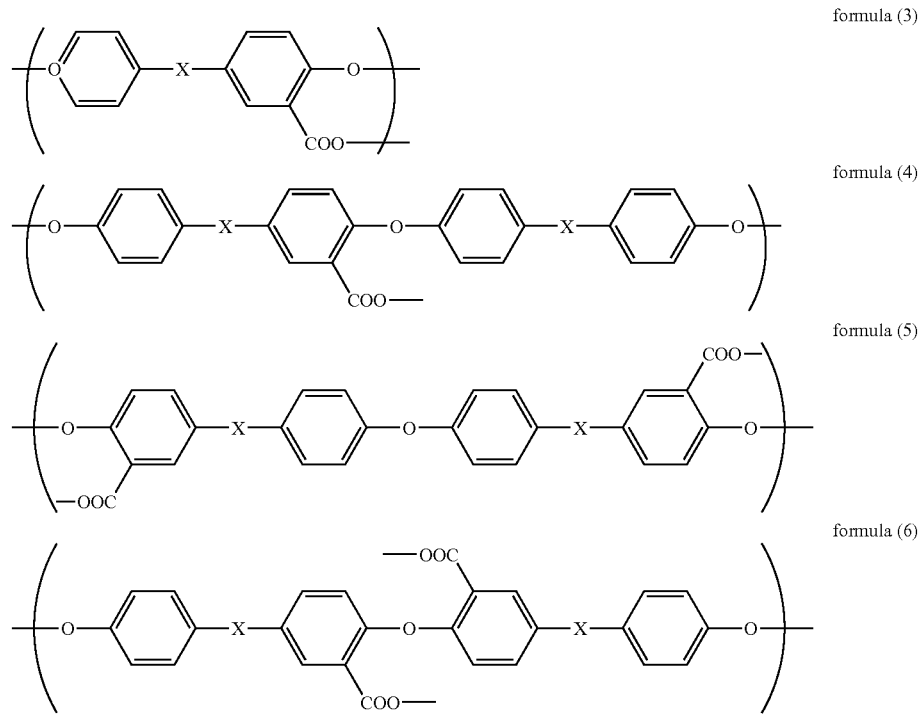

formula (3)

formula (4)

formula (5)

formula (6)

(In formulae (3) to (6), X is a member selected from the group consisting of a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, and bivalent groups represented by —O—, —S—, —CO—, —SO—, and —SO$_2$—.)

It has hitherto been known that in a process for producing a polycarbonate represented by formula (1) by the melt method (transesterification method), structural units of formulae (3) and (4) are yielded by causing a rearrangement reaction in the polymerization reaction system (e.g., *Encyclopedia of Polymer Science and Technology*, Vol.10, p.723 (1969)). On the other hand, polycarbonate production by the melt method conducted under other specific conditions was found to yield structural units of formula (5) and/or formula (6). Although the mechanism of the formation of structural units of formula (5) or (6) has not been entirely elucidated, the structural units are presumed to be yielded through the following path. The amount of the structural units of formulae (5) and (6) is smaller than that of the structural units of formulae (3) and (4). However, the structural units of formulae (5) and (6) are important elements in producing the target branched aromatic polycarbonate having excellent melt characteristics.

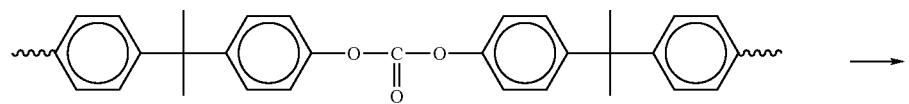
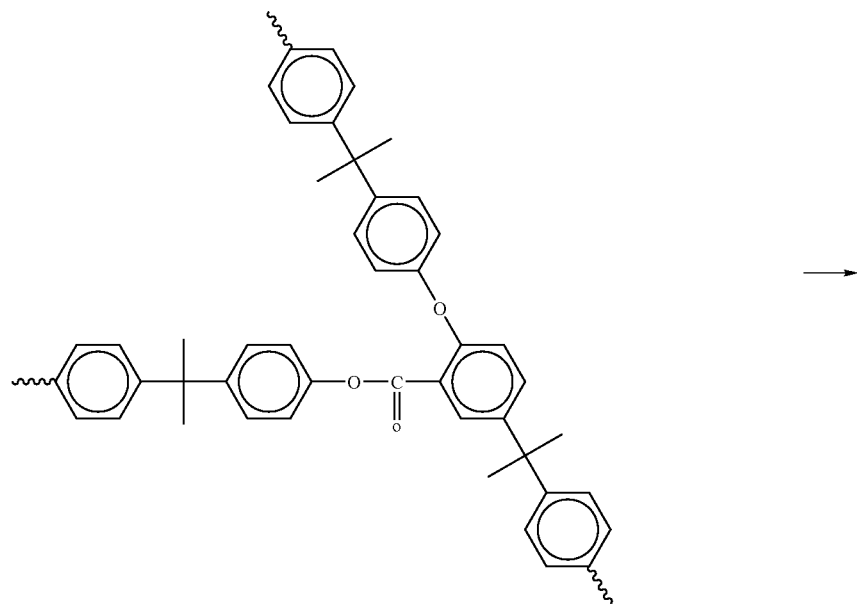
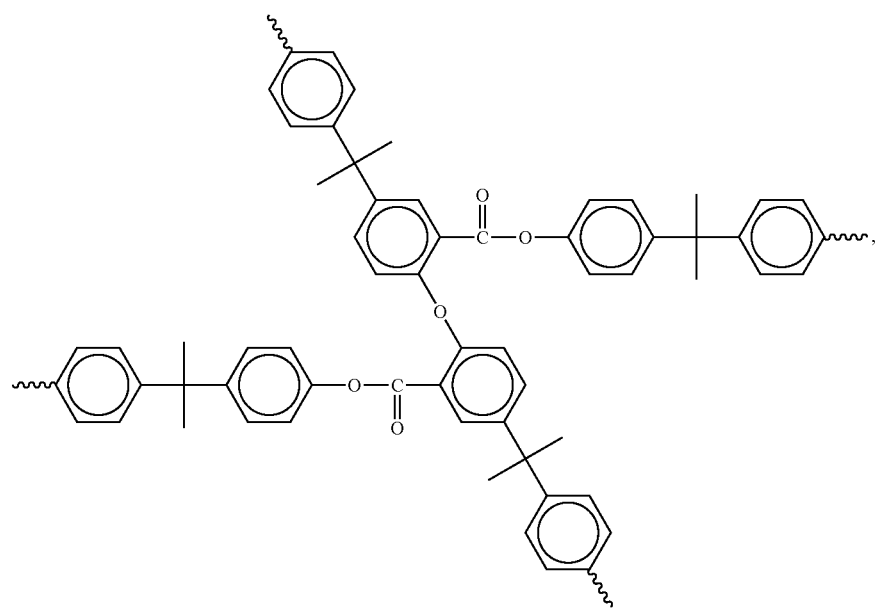

-continued

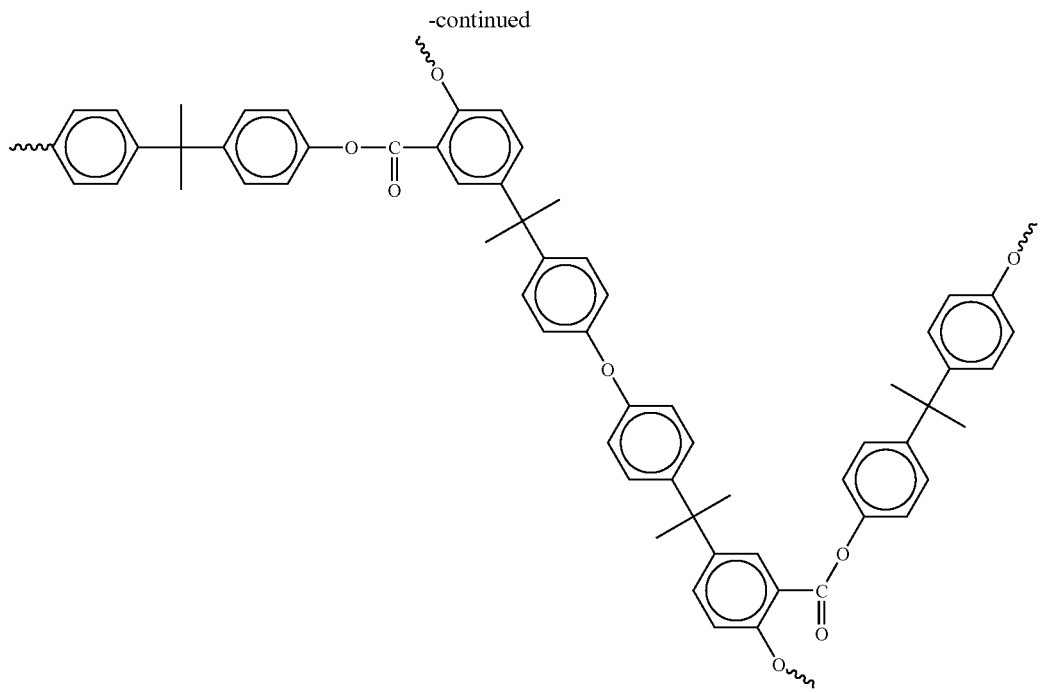

The value of Mw/Mn is preferably in the range of from 2.8 to 4.0, more preferably in the range of from 2.8 to 3.8. The value of Mv/Mn' is generally from 1.8 to 3.5, preferably in the range of from 1.85 to 3.40, more preferably in the range of from 1.90 to 3.30. Moreover, the proportion of the number of moles of all the branched structural units represented by formulae (3) to (6) to 1 mol of the structural units represented by formula (1) is preferably in the range of from 0.30 to 0.90 mol %, excluding 0.30 mol %, and more preferably in the range of from 0.30 to 0.85 mol %, excluding 0.30 mol %.

Furthermore, the branched aromatic polycarbonate of the invention preferably is one in which the value represented by α in the following formula (7) is from 0.03 to 0.3.

$$\alpha = p^2\rho/[1-p^2(1-\rho)]$$ formula (7)

(In formula (7), α represents the probability that a molecular end is a branched unit; p represents the probability that n repeating units are yielded; and ρ represents the number of branched units.) n hereinafter represents the number calculated by an expression: n=Mn/M, wherein Mn represents a number average molecular weight of the polymer and M represents a molecular weight of the repeating unit.

Formula (7) is known as a relationship described in the gelation theory proposed by P. J. Flory (see, for example, *Kôbunshi Kagaku* (ge), Maruzen K. K., p.325).

The value of α represented by formula (7) is preferably in the range of from 0.05 to 0.2, more preferably in the range of from 0.055 to 0.15, especially preferably in the range of from 0.06 to 0.12.

When the value of α is within that range, a branched aromatic polycarbonate having improved melt characteristics and an improved hue is obtained.

It is known that in case where α exceeds 0.3, gelation occurs as can be seen from the gelation theory by P. J. Flory. When gelation occurs, the polycarbonate gives molded objects, such as sheets and bottles, which have a large amount of fish-eyes in the surface thereof and the polycarbonate has impaired flowability and reduced moldability. In case where α is smaller than 0.03, desired melt characteristics are not obtained and it is impossible to obtain sheets or bottles by extrusion molding.

The proportion (mol %) of the number of moles of the branched structural units represented by formula (5) to 1 mol of the structural units represented by formula (1) is preferably from 0.0002 to 0.15 mol %, more preferably from 0.0003 to 0.12 mol %. Furthermore, the proportion (mol %) of the number of moles of the branched structural units represented by formula (6) to 1 mol of the structural units represented by formula (1) is preferably from 0.0002 to 0.15 mol %, more preferably from 0.0003 to 0.12 mol %.

The branched aromatic polycarbonate of the invention preferably has a flow rate ratio (MVR-R), as represented by the following formula (8) and determined in accordance with JIS K 7210, in the range of from 15 to 45. More preferably, the MVR-R thereof is in the range of from 18 to 40. In case where the value of MVR-R is smaller than the range shown above, melt tension is not obtained and the target branched aromatic polycarbonate having excellent melt characteristics cannot be produced. In case where the value thereof is larger than the range shown above, the results are too high a melt tension and poor flowability and the target branched aromatic polycarbonate having excellent melt characteristics cannot be produced.

$$MVR\text{-}R = MVR(21.6)/MVR(2.16)$$ formula (8)

Furthermore, the branched aromatic polycarbonate of the invention, when examined with a capillary rheometer (manufactured by Toyo Seiki Ltd.) at 250° C. and at an extrusion speed of 10 mm/min and a haul-off speed of 20 mm/min, preferably has a melt tension in the range of from 60 to 160 mN. The polycarbonate more preferably has a value of the melt tension in the range of from 80 to 150 mN. In case where the melt tension of the resin is lower than that range, the resin cannot retain its shape, i.e., a branched aromatic polycarbonate having excellent suitability for blow molding cannot be produced. In case where the melt tension thereof is higher than that range, the results are too high a melt tension and poor flowability and the target branched aromatic polycarbonate having excellent melt characteristics cannot be produced.

The proportion of the number of moles of all the branched structural units represented by formulae (3) to (6) to 1 mol of the structural units represented by formula (1) can be easily determined from the amounts of the respective kinds of structural units determined by subjecting the aromatic polycarbonate produced to alkali hydrolysis and then analysis by high-performance liquid chromatography (HPLC), gel permeation chromatography (GPC), etc. However, when bisphenol A, for example, was used as an aromatic dihydroxy compound and the aromatic polycarbonate produced is analyzed by high-performance liquid chromatography (HPLC) or the like after alkali hydrolysis, then the structural units represented by formulae (1) and (3) to (6) are detected respectively as compounds represented by the following formulae (9) to (13). Consequently, the amounts of those structural units were determined from the extinction coefficients of standard substances for the respective compounds. Specifically, calibration curves concerning concentration and peak area were drawn using standard substances for the respective compounds to determine the content of each kind of units.

There also is a simple method of determination. In this method, the content of each kind of units can be calculated from the extinction coefficient of bisphenol A. The relationship between the extinction coefficient of each of the compounds of formulae (10) to (13) and the extinction coefficient of bisphenol A are as follows. For example, the extinction coefficient for formula (10) is 2.2 times the extinction coefficient of bisphenol A. The extinction coefficient for formula (11) and that for formula (12) or (13) are 1.5 times and 1.7 times, respectively, the extinction coefficient of bisphenol A.

The aromatic polycarbonate produced by the transesterification method generally contains low-molecular compounds remaining therein, such as the starting-material monomers, catalyst, aromatic monohydroxy compounds yielded as by-products by the transesterification reaction, and polycarbonate oligomers. Of these, the starting-material monomers and aromatic monohydroxy compounds are undesirable because they remain in a large amount and exert adverse influences on properties such as thermal aging resistance and hydrolysis resistance. From this standpoint, it is preferred that in the branched aromatic polycarbonate of the invention, the amount of the residual aromatic dihydroxy compounds be 300 ppm by weight or smaller and that of the residual aromatic monohydroxy compounds be 300 ppm by weight or smaller. Furthermore, carbonic diester compounds, among the starting-material monomers, emit an

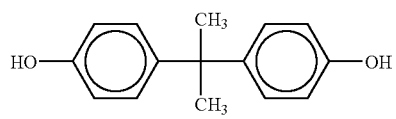

formula (9)

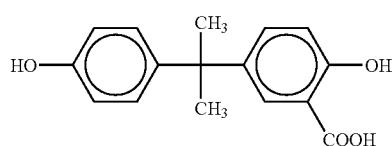

formula (10)

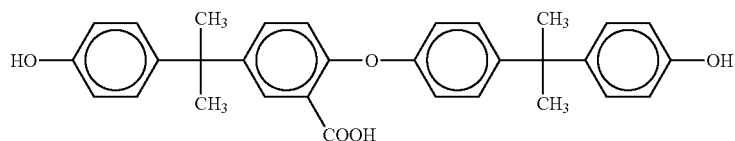

formula (11)

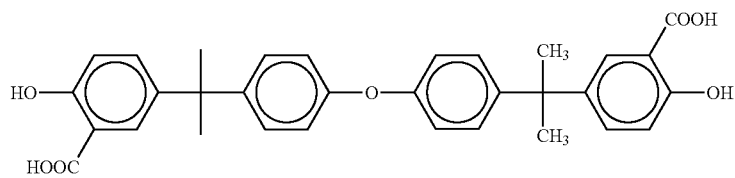

formula (12)

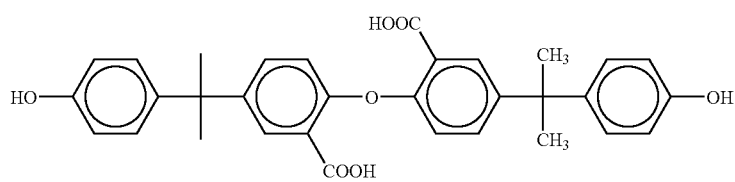

formula (13)

odor during melt molding or impart an odor to blow-molded hollow containers, and this odor becomes problematic especially when the containers are used in food applications. It is therefore necessary to remove the carbonic diester compounds to such a degree that the amount of these compounds remaining in the polycarbonate decreases to preferably 200 ppm by weight or smaller, more preferably 100 ppm by weight or smaller, most preferably 60 ppm by weight or smaller.

Methods for reducing the amount of the starting-material monomers and aromatic monohydroxy compounds remaining in the polycarbonate yielded by the transesterification method are not particularly limited. For example, use can be made of a method in which the carbonic diester compound and others remaining in the transesterification-method polycarbonate are continuously removed by volatilization with a vented extruder after polymerization or a method in which pellets obtained are heat-treated under vacuum. In the case where the method in which volatiles are continuously removed with a vented extruder is used among those methods, side reactions during the volatile removal can be inhibited by adding an acidic compound or a precursor thereof to deactivate beforehand the basic transesterification catalyst remaining in the resin. Thus, the aromatic dihydroxy compound and carbonic diester compound as starting-material monomers and aromatic monohydroxy compounds can be efficiently removed.

The acidic compound or precursor thereof to be added is not particular limited, and any acidic compound or a precursor thereof can be used as long as it has the effect of neutralizing the basic transesterification catalyst used for the polycondensation reaction. Examples thereof include Brønsted acids such as hydrochloric acid, nitric acid, boric acid, sulfuric acid, sulfurous acid, phosphoric acid, phosphorous acid, hypophosphorous acid, polyphosphoric acid, adipic acid, ascorbic acid, aspartic acid, azelaic acid, adenosine phosphate, benzoic acid, formic acid, valeric acid, citric acid, glycolic acid, glutamic acid, glutaric acid, cinnamic acid, succinic acid, acetic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, bezenesulfinic acid, benzenesulfonic acid, malonic acid, and maleic acid and esters of these acids. These compounds may be used alone or in combination of two or more thereof. Especially preferred of these acidic compounds or precursors thereof are the sulfonic acid compounds or ester compounds thereof, such as, e.g., p-toluenesulfonic acid, methyl p-toluenesulfonate, and butyl p-toluenesulfonate.

The amount of the acidic compound or precursor thereof to be added is in the range of from 0.1 to 50 times by mole, preferably from 0.5 to 30 times by mole, the amount of the basic transesterification catalyst used for the polycondensation reaction and to be neutralized. The acidic compound or precursor thereof may be added at any desired time after the polycondensation reaction, and there are no particular limitations of methods for addition. Any of a method in which the acidic compound or precursor thereof is directly added, a method in which the compound is added in the form of a solution in an appropriate solvent, a method in which a masterbatch in a pellet or flaky form is used, and the like may be used according to the properties of the compound or desired conditions.

The extruder to be used for the removal by volatilization of low-molecular compounds including the carbonic diester compound may be either a single-screw or twin-screw extruder. The twin-screw extrude is a matched-twin-screw extruder, in which the directions of rotation may be the same or different. From the standpoint of removing volatiles, it is preferred to use one which has vents after a part for adding an acidic compound. Although the number of vents is not limited, a multi-vent extruder having from two to ten vents is generally employed. In the extruder, additives such as a stabilizer, ultraviolet absorber, release agent, and colorant may be added and kneaded together with the resin according to need.

A colorant can be added to the branched polycarbonate of the invention for the purpose of providing colored molded objects. Although the colorant is not particularly limited, it is preferred to use a colorant comprising one or more dyes/pigments selected from Phthalocyanine Blue dyes and anthraquinone dyes because these dyes are satisfactory in the effect of diminishing the odor of the carbonic diester remaining in the branched polycarbonate and in the hydrolytic resistance, initial haze, and other properties of molded objects. Preferred of Phthalocyanine Blue dyes is Pigment Blue 15:3 (C.I. generic name). Preferred among anthraquinone dyes are blue or violet dyes, in particular, Solvent Blue 90, Solvent Blue 97, Solvent Violet 36, and Solvent Violet 13 (each being a C.I. generic name). Most preferred of these is Pigment Blue 15:3 (C.I. generic name). The amount of the colorant to be incorporated is not particularly limited as long as molded objects are colored in a desired hue. From the standpoint of odor diminution, however, the amount thereof is preferably 100 ppm by weight or smaller, more preferably from 0.1 to 40 ppm by weight, most preferably from 5 to 30 ppm by weight. Even when the amount of the colorant incorporated exceeds 100 ppm by weight, the effect of odor diminution is low. Methods for colorant incorporation into the transesterification-method polycarbonate and the time for the incorporation may be the same as the methods and time for additive incorporation.

Branched Polycarbonate Composition: At least one additive selected from a stabilizer, ultraviolet absorber, release agent, and the like can be incorporated into the branched polycarbonate of the invention according to need. Such additives are not particularly limited, and ones in ordinary use in polycarbonates can be used.

Examples of the stabilizer include hindered phenol compounds, phosphorus compounds, sulfur compounds, epoxy compounds, and hindered amine compounds. It is preferred to use at least one antioxidant selected from hindered phenol compounds and phosphorus compounds among those compounds.

Specific examples of the hindered phenol compounds include n-octadecyl 3-(3,5-di-t-butyl-4-hydroxyphenyl)-propionate, 1,6-hexanediol bis[3-(3,5-di-t-butyl-4-hydroxyphenyl)propionate], pentaerythritol tetrakis[3-(3,5-di-t-butyl-4-hydroxyphenyl)propionate], 3,9-bis[1,1-dimethyl-2-{β-(3-(3-t-butyl-4-hydroxy-5-methylphenyl) propionyloxy}ethyl]-2,4,8,10-tetraoxaspiro[5,5]undecane, triethylene glycol bis[3-(3-t-butyl-5-methyl-4-hydroxyphenyl)propionate], 3,5-di-t-butyl-4-hydroxybenzylphosphonate diethyl ester, 1,3,5-trimethyl-2,4,6-tris(3,5-di-t-butyl-4-hydroxybenzyl)benzene, thiodiethylene bis[3-(3,5-di-t-butyl-4-hydroxyphenyl)-propionate], tris(3,5-di-t-butyl-4-hydroxybenzyl)isocyanurate, and N,N'-hexamethylenebis(3,5-di-t-butyl-4-hydroxyhydrocinnamide). Preferred of these are n-octadecyl 3-(3,5-di-t-butyl-4-hydroxyphenyl)propionate, 1,6-hexanediol bis[3-(3,5-t-butyl-4-hydroxyphenyl) propion-ate], and 3,9-bis[1,1-dimethyl-2-{β-(3-t-butyl-4-hydroxy-5-methylphenyl)propionyloxy}ethyl]-2,4,8,10-tetraoxaspiro-[5,5]undecane.

The phosphorus compounds preferably are compounds of trivalent phosphorus. It is especially preferred to use at least one member selected from one or more phosphorous esters at least one of which is a phosphorous ester esterified with phenol and/or a phenol having at least one alkyl group having 1 to 25 carbon atoms and from tetrakis(2,4-di-t-butylphenyl)4,4'-biphenylenediphosphonite. Specific examples of the phosphorus esters include 4,4'-butylidenebis(3-methyl-6-t-butylphenylditridecyl)phosphite, 1,1,3-tris(2-methyl-4-(ditridecyl phosphite)-5-t-butylphenyl) butane, trisnonylphenyl phosphite, dinonylphenylpentaerythritol diphosphite, tris(2,4-di-t-butylphenyl)phosphite, bis(2,4-di-t-butylphenyl)pentaerythritol diphosphite, di(2,6-di-t-butyl-4-methylphenyl)pentaerythritol diphosphite, 2,2'-ethylidenebis(4,6-di-t-butylphenyl)fluorophosphite, 2,2'-methylenebis(4,6-di-t-butylphenyl)octyl phosphite, bis(2,4-dicumylphenyl) pentaerythritol diphosphite, phosphorous esters formed from mononylphenol or dinonylphenol, and phosphorous esters having a hindered phenol shown in formula (3).

Preferred phosphorus compounds in the invention are tetrakis(2,4-di-t-butylphenyl)4,4'-biphenylenediphosphonite, tris(2,4-di-t-butylphenyl)phosphite, and 2,2'-methylenebis(4,6-di-t-butylphenyl)octyl phosphite.

The amount of the stabilizer to be incorporated is up to 1 part by weight, preferably up to 0.4 parts by weight, per 100 parts by weight of the branched polycarbonate. Amounts thereof exceeding 1 part by weight pose problems, for example, that hydrolytic resistance becomes poor. In the case where a combination of stabilizers is used, the proportions of these may be selected at will. Whether any one stabilizer is used or a combination of stabilizers is used is suitably determined according to the intended use of the polycarbonate, etc. For example, phosphorus compounds generally are highly effective in improving high-temperature residence stability in polycarbonate molding and the thermal stability during use of molded objects, while phenol compounds generally are highly effective in improving the thermal stability during use of molded objects formed from the polycarbonate, such as thermal aging resistance. Furthermore, use of a phosphorus compound and a phenol compound in combination enhances the effect of improving colorability.

Examples of the ultraviolet absorber include inorganic ultraviolet absorbers such as titanium oxide, cerium oxide, and zinc oxide, and further include organic ultraviolet absorbers such as benzotriazole compounds, benzophenone compounds, and triazine compounds. Preferred of these in the invention are organic ultraviolet absorbers. Especially preferred is at least one member selected from benzotriazole compounds, 2-(4,6-diphenyl-1,3,5-triazin-2-yl)-5-[(hexyl) oxy]phenol, 2-[4,6-bis(2,4-dimethylphenyl)-1,3,5-triazin-2-yl]-5-(octyloxy)phenol, 2,2'-(1,4-phenylene)bis[4H-3,1-benzoxazin-4-one], and [(4-methoxyphenyl)methylene] propanedioic acid dimethyl ester.

Specific examples of the benzotriazole compounds include 2-bis(5-methyl-2-hydroxyphenyl)benzotriazole, 2-(3,5-di-t-butyl-2-hydroxyphenyl)benzotriazole, 2-(3,5-di-t-butyl-2-hydroxyphenyl)-5-chlorobenzotriazole, 2-(3-t-butyl-5-methyl-2-hydroxyphenyl)-5-chlorobenzotriazole, 2-(2-hydroxy-5-t-octylphenyl)benzotriazole, 2-(3,5-di-t-amyl-2-hydroxyphenyl)benzotriazole, 2-[2-hydroxy-3,5-bis (α,α-dimethylbenzyl)phenyl]-2H-benzotriazole, 2,2'-methylenebis[4-(1,1,3,3-tetramethylbutyl)-6-(2H-benzotriazol-2-yl)phenol], and methyl 3-[3-t-butyl-5-(2H-benzotriazol-2-yl)-4-hydroxyphenyl propionate/polyethylene glycol condensates.

Especially preferred of those are 2-(2-hydroxy-5-t-octylphenyl)benzotriazole, 2-[2-hydroxy-3,5-bis(α,α-dimethylbenzyl)phenyl]-2H-benzotriazole, 2,2'-methylenebis[4-(1,1,3,3-tetramethylbutyl)-6-(2H-benzotriazol-2-yl)-phenol], 2-(4,6-diphenyl-1,3,5-triazin-2-yl)-5-[(hexyl)-oxy]phenol, and 2-[4,6-bis(2,4-dimethylphenyl)-1,3,5-triazin-2-yl]-5-(octyloxy)phenol.

The amount of the ultraviolet absorber to be incorporated is up to 10 parts by weight, preferably up to 1 part by weight, per 100 parts by weight of the polycarbonate. Amounts thereof exceeding 10 parts by weight pose problems, for example, that mold fouling occurs during injection molding. Although one of those ultraviolet absorbers can be used alone, a combination of two or more thereof can also be used.

The release agent comprises at least one compound selected from aliphatic carboxylic acids, esters of aliphatic carboxylic acids, aliphatic hydrocarbon compounds having a number-average molecular weight of from 200 to 15,000, and polysiloxane type silicone oils. Preferred of these is at least one member selected from aliphatic carboxylic acids and esters of aliphatic carboxylic acids.

Examples of the aliphatic carboxylic acids include saturated or unsaturated, aliphatic, monocarboxylic acids, dicarboxylic acids, or tricarboxylic acids. The aliphatic carboxylic acids include alicyclic carboxylic acids. Of these, preferred aliphatic carboxylic acids are mono- or dicarboxylic acids having 6 to 36 carbon atoms. More preferred are aliphatic saturated monocarboxylic acids having 6 to 36 carbon atoms. Specific examples of such aliphatic carboxylic acids include palmitic acid, stearic acid, valeric acid, caproic acid, capric acid, lauric acid, arachic acid, behenic acid, lignoceric acid, cerotic acid, melissic acid, montanic acid, glutaric acid, adipic acid, and azelaic acid.

The aliphatic carboxylic acid ingredients serving as components of the aliphatic carboxylic acid esters can be the same aliphatic carboxylic acids as those enumerated above. On the other hand, examples of the alcohol ingredients serving as components of the aliphatic carboxylic acid esters include saturated or unsaturated, monohydric alcohols and saturated or unsaturated polyhydric alcohols. These alcohols may have substituents such as fluorine atoms and aryl groups. Preferred of these alcohols are mono- or polyhydric alcohols having up to 30 carbon atoms. More preferred are aliphatic, saturated, mono- or polyhydric alcohols having up to 30 carbon atoms. The aliphatic alcohols include alicyclic alcohols. Specific examples of these alcohols include octanol, decanol, dodecanol, stearyl alcohol, behenyl alcohol, ethylene glycol, diethylene glycol, glycerol, pentaerythritol, 2,2-dihydroxyperfluoropropanol, neopentylene glycol, ditrimethylolpropane, and dipentaerythritol. Those aliphatic carboxylic acid esters may contain aliphatic carboxylic acids and/or alcohols as impurities, and may be a mixture of two or more compounds. Examples of the aliphatic carboxylic acid esters include beeswax (mixture containing myricyl palmitate as a major component), stearyl stearate, behenyl behenate, octyldodecyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate, and pentaerythritol tetrastearate.

The amount of the release agent to be incorporated is up to 5 parts by weight, preferably up to 1 part by weight, per 100 parts by weight of the polycarbonate. Amounts thereof exceeding 5 parts by weight pose problems, such as, e.g., reduced hydrolytic resistance and mold fouling during injection molding. Although one of those release agents can be used, a combination of two or more thereof can also be used.

The colorant according to the invention and additives including a stabilizer, ultraviolet absorber, and release agent are not particularly limited in the time and methods for addition thereof. For example, with respect to the time for addition, the additive ingredients may be added (1) during the polymerization reaction, (2) at the time when the polymerization reaction is terminated, or (3) after the catalyst used for the polymerization is deactivated with a catalyst deactivator and before pelletization. Furthermore, the additive ingredients may be added when the polycarbonate is in a molten state, for example, during kneading thereof with other ingredients. It is also possible to blend the additive ingredients with the solid polycarbonate in a pellet, powder, or another form and knead the mixture with an extruder or the like. However, from the standpoints of inhibiting these additives from decomposing and inhibiting coloration, it is preferred to add the additives at any of the following times: (1) during the polymerization reaction, (2) at the time when the polymerization reaction is terminated, and (3) after the catalyst used for the polymerization is deactivated with a catalyst deactivator and before pelletization.

With respect to methods for addition, it is possible to directly mix or knead the colorant and additives including a stabilizer, ultraviolet absorber, and release agent with the polycarbonate. However, it is possible to add the additive ingredients in the form of a solution in an appropriate solvent or of a high-concentration masterbatch prepared with a small amount of the polycarbonate or another resin, etc. In the case where those compounds are used in combination, they may be separately or simultaneously added to the polycarbonate.

The invention includes a polycarbonate resin composition having desired properties obtained by adding to the polycarbonate described above one or more other thermoplastic resins and additives such as a flame retardant, impact modifier, antistatic agent, slip agent, antiblock agent, lubricant, antifogging gent, natural oil, synthetic oil, wax, organic filler, and inorganic filler in such amounts as not to impair the objects of the invention.

The hollow container of the invention obtained by blow molding can be formed by direct blow molding or by using generally known blow molding techniques such as injection blow and injection stretch blow. In direct blow molding, for example, polycarbonate pellets are fed to a single- or twin-screw extruder having a set cylinder temperature of from 240 to 270° C., melted/kneaded with screw shearing, and extruded through a nozzle to form a tubular molten parison. Thereafter, the parison is placed in a mold having a given shape and regulated so as to have a temperature of 20 to 110° C., and air or an inert gas is blown into the parison to thereby form a food container. In the case of a bottle for dairy products, bottle for refreshing beverages, or bottle for water, the biaxially stretching blow molding disclosed in, e.g., JP-A-6-122145 can also be used for bottle formation. Multilayer blow molding with polyethylene terephthalate) or a polyamide can also be used for the purpose of improving the gas barrier properties of the polycarbonate.

The size of the hollow container of the invention, which is obtained by blow molding, is not particularly limited. However, the wall thickness thereof is preferably from 0.1 to 7 mm, more preferably from 0.2 to 5 mm, most preferably from 0.3 to 3 mm, from the standpoint of the strength and shape retention of the hollow container.

The hollow container of the invention, which is obtained by blow molding, can be used in a variety of applications. However, the hollow container preferably is a bottle for a dairy product, a bottle for a refreshing beverage, or a bottle for water.

EXAMPLES

The invention will be explained below by reference to Examples, but the invention should not be construed as being limited to these Examples.

The bisphenol A used in the following Examples and Comparative Examples and the aromatic polycarbonates obtained therein were analyzed by the following examination methods.

(1) Viscosity-Average Molecular Weight (Mv)

The intrinsic viscosity $[\eta]$ of an aromatic polycarbonate (sample) in methylene chloride was measured at 20° C. with a Ubbelohde's viscometer, and the molecular weight was determined using the following formula (2).

$$\eta_{sp}/C=[\eta]\times(1+0.28\eta_{sp})$$

$$[\eta]=1.23\times10^{-4}\times(Mv)^{0.83} \qquad \text{formula (2)}$$

(In formula (2), $\eta_{sp}$ is the specific viscosity of a methylene chloride solution of the polycarbonate resin as measured at 20° C. and C is the concentration of this methylene chloride solution. The methylene chloride solution is one having a polycarbonate resin concentration of 0.6 g/dl).

(2) Number-Average Molecular Weight Calculated from Number of All Molecular Ends (Mn')

In 0.4 ml of heavy chloroform was dissolved 0.02 g of a sample. The solution was examined with a 1H-NMR apparatus (JNM-A1400, manufactured by JEOL Ltd.) at 30° C. to determine the amount of terminal hydroxyl groups (μeq/g) and the number of terminal phenyl groups (μeq/g). By summing up both, the number of all molecular ends was determined. Furthermore, the number-average molecular weight (Mn') is calculated using the following equation.

[Amount of terminal hydroxyl groups (μeq/g)] +

[number of terminal phenyl groups (μeq/g)] = number of all molecular ends (μeq/g)

$Mn' = 2 \times 10^6 /$ (number of all molecular ends)

(3) Degree of Branching (mol %)

The degree of branching is expressed as the proportion (mol %) of the number of moles of all branched structural units represented by formulae (3) to (6) to 1 mol of structural units represented by formula (1). Specifically, the content of each kind of structural units was determined in the following manner, and the proportion (mol %) of the number of moles of structural units represented by formulae (10) to (13) to 1 mol of structural units represented by formula (9) was calculated from the results of the measurement.

One gram of an aromatic polycarbonate (sample) was dissolved in 100 ml of methylene chloride. Thereafter, 18 ml of a 28% methanol solution of sodium methoxide and 80 ml of methanol were added thereto and 25 ml of pure water was further added. The resultant mixture was stirred at room temperature for 2 hours to completely hydrolyze the polycarbonate. Thereafter, 1 N hydrochloric acid was added to the mixture to neutralize it. The methylene chloride layer was separated to obtain a hydrolyzate.

In 10 ml of acetonitrile was dissolved 0.05 g of the hydrolyzate. This solution was examined by reversed-phase high-performance liquid chromatography (HPLC). In the reversed-phase liquid chromatography, mixed solvents consisting of acetonitrile and 10 mM aqueous ammonium acetate solution were used as eluents. The hydrolyzate solution was analyzed at a column temperature of 40° C. under such conditions that the proportion of acetonitrile/10 mm aqueous ammonium acetate solution was changed with a gradient from 20/80 to 80/20. For detection was used a UV detector having a wavelength of 280 nm (SPD-6A, manufactured by Shimadzu Corp.).

The structural units represented by formulae (1) and (3) to (6) are detected as compounds represented by formulae (9) to (13). These compounds were hence identified using an LC-MS apparatus (Agilent-1100) manufactured by Agilent Co., Ltd. and an NMR apparatus (AL-400) manufactured by JEOL Ltd. In determining the content of each kind of structural units, calibration curves concerning concentration and peak area were drawn using standard substances for the respective compounds to determine each content therefrom.

(4) Weight-Average Molecular Weight (Mw), Number-Average Molecular Weight (Mn), and Mw/Mn As an analyzer was used HLC-8020 (manufactured by Tosoh Corp.). Four columns (diameter, 7.8 mmφ; length, 300 mm) respectively packed with TSK 5000HLX, 4000HLX, 3000HLX, and 2000HLX (each manufactured by Tosoh Corp.) as packings were connected to the analyzer. Tetrahydrofuran was used as an eluent. Calibration curves were drawn using standard polystyrenes (molecular weights; 761 (Mw/Mn≦1.14), 2,000 (Mw/Mn≦1.20), 4,000 (Mw/Mn≦1.06), 9,000 (Mw/Mn≦1.04), 17,500 (Mw/Mn≦1.03), 50,000 (Mw/Mn≦1.03), 233,000 (Mw/Mn≦1.05), 600,000 (Mw/Mn≦1.05), and 900,000 (Mw/Mn≦1.05)) manufactured by Chemco Co., Ltd.

The values of Mw and Mn in terms of polystyrene were determined from charts obtained through refractive index measurement, and Mw/Mn was calculated therefrom.

(5) MVR-R

An aromatic polycarbonate (sample) dried at 130° C. for 5 hours was examined with a melt indexer manufactured by Takara Thermister Instruments Co., Ltd., in accordance with JIS K 7210. The value of MVR-R was determined using the following formula from the melt flow volume per unit time as measured at 280° C. under a load of 21.6 kg, MVR(21.6), and the melt flow volume per unit time as likewise measured at 280° C. under a load of 2.16 kg, MVR(2.16).

$$MVR\text{-}R = MVR(21.6)/MVR(2.16) \quad \text{formula (8)}$$

(6) Hue (YI)

Using an injection molding machine, a molded object was obtained under the following conditions from an aromatic polycarbonate (sample) dried at 130° C. for 5 hours.

A sheet having dimensions of 100 mm×100 mm ×3 mm (thickness) was obtained by injection at 360° C. This sheet was examined with a color tester (SC-1-CH, manufactured by Suga Test Instruments Co., Ltd.) to measure the tristimulus values XYZ, which are absolute values of color. The value of YI, i.e., an index to yellowness, was calculated using the following relationship.

$$YI = (100/Y) \times (1.28 \times X - 1.06 \times Z)$$

The larger the value of YI, the more the molded object has been colored.

(7) Melt Tension (mN)

A sample dried at 130° C. for 5 hours was examined with a capillary rheometer (manufactured by Toyo Seiki Ltd.) at 250° C. and at an extrusion speed of 10 mm/min and a haul-off speed of 20 mm/min.

(8) Determination of Carbonic Diester Compound

A high-performance liquid chromatography equipped with a UV detector and a column employing μ-Bondersphere, manufactured by Waters Inc., was used for the determination using acetonitrile/aqueous acetic acid solution as a solvent.

(9) Determination of Terminal OH

Colorimetric determination was conducted by the titanium tetrachloride/acetic acid method (method described in *Macromol. Chem.* 88, 215(1965)). The found value of the weight of terminal OH groups relative to the weight of the polycarbonate is shown in ppm unit.

(10) Hydrolytic Resistance (Haze)

Using an injection molding machine having a set cylinder temperature of 280° C., a 3 mm-thick test piece was molded from polycarbonate pellets (sample) dried at 130° C. for 5 hours. This test piece was held in 120° C. water vapor for 50 hours. The haze of this test piece was measured with turbidimeter NDH 2000 (manufactured by Nippon Denshoku Kogyo K. K.) before and after the treatment.

(11) Blow Molding

A sample dried at 130° C. for 5 hours was subjected to blow molding with B-30, manufactured by The Japan Steel Works, Ltd., at a barrel temperature of 240 to 270° C. and a mold temperature of 70° C. to produce a 5-gallon bottle. Thus, moldability was evaluated. Simultaneously therewith, the nose was brought near to the mouth of the molded object immediately after the molding to smell it. The test pieces on which no odor was noticed were judged to be ○, those on which an odor was slightly noticed were judged to be Δ, and those on which an odor was noticed were judged to be X. Furthermore, after the molded object was allowed to cool sufficiently at room temperature, it was filled with water and dropped from a height of 1.8 m onto an iron plate. The molded object was then examined for breakage.

Example 1

A melt prepared by mixing diphenyl carbonate and bisphenol A in a given molar ratio (DPC/BPA=1.040) in a nitrogen gas atmosphere was continuously fed, at a flow rate of 88.7 kg/hr through a starting-material introduction tube, to a first vertical stirring polymerizer having a capacity of 100 L and kept at 220° C. and $1.33 \times 10^4$ Pa. The degree of opening of the valve disposed in a polymer discharge line at the bottom of the polymerizer was controlled so as to result in an average residence time of 60 minutes, and the liquid level was kept constant. Furthermore, simultaneously with the feeding of the mixture, an aqueous cesium carbonate solution as a catalyst was continuously supplied at a rate of 0.6 μmol per mole of the bisphenol A (1.2 μmol in terms of metal amount per mole of the bisphenol A).

The liquid resulting from the polymerization and discharged from the polymerizer bottom was subsequently continuously fed successively to second and third vertical stirring polymerizers (capacity, 100 L) and a fourth horizontal polymerizer (capacity, 150 L), and discharged through the polymer discharge opening in the bottom of the fourth polymerizer. Subsequently, this polymer in the molten state was sent to a twin-screw extruder and continuously kneaded together with butyl p-toluenesulfonate (in an amount 4 times by mole the amount of the cesium carbonate used as a catalyst), and passed through a die and thereby formed into strands, which were cut with a cutter to obtain pellets. Reaction conditions in the second to fourth polymerizers were: (240° C., 2.00×10³ Pa, and 75 rpm) in the second polymerizer; (270° C., 66.7 Pa, and 75 rpm) in the third polymerizer; and (285° C., 67 Pa, and 5 rpm) in the fourth polymerizer. Conditions were regulated so that the temperature and the degree of vacuum increased and the stirring speed decreased with the progress of the reaction. During the reaction, the liquid level was controlled so that the average residence time in the second to fourth polymerizers was 60 minutes and, simultaneously therewith, the phenol which was being generated as a by-product was distilled off.

A polycarbonate having a viscosity-average molecular weight of 24,500 was obtained. This polycarbonate was examined for Mw/Mn, Mv/Mn', degree of branching, hue (YI), melt tension, and suitability for blow molding. The results are shown in Table 1.

Examples 2 and 3 and Comparative Examples 1 to 3

Polymerization was conducted in the same manner as in Example 1, except that the production conditions shown in Table 1 were used. Thus, aromatic polycarbonates were produced. The results are shown in Table 1.

TABLE 1

| | | Example 1 | | Example 2 | | Example 3 | | Example 4 | | Example 5 | |
|---|---|---|---|---|---|---|---|---|---|---|---|
| Catalyst | Kind | $Cs_2CO_3$ | | $Cs_2CO_3$ | | $Cs_2CO_3$ | | $Cs_2CO_3$ | | NaOH | |
| | Concentration (μmol/BPA-mol) | 0.6 | | 0.7 | | 1.5 | | 2.5 | | 1.5 | |
| | Alkali metal concentration (μmol/BPA-mol) | 1.2 | | 1.4 | | 3 | | 5 | | 1.5 | |
| First vertical stirring polymerizer | Temperature, ° C. | 220 | | 220 | | 220 | | 220 | | 220 | |
| | Pressure, Pa | $1.33 \times 10^4$ | | $1.33 \times 10^4$ | | $1.33 \times 10^4$ | | $1.33 \times 10^4$ | | $1.33 \times 10^4$ | |
| | Residence time, min | 60 | | 60 | | 60 | | 60 | | 60 | |
| Second vertical stirring polymerizer | Temperature, ° C. | 240 | | 240 | | 240 | | 240 | | 240 | |
| | Pressure, Pa | $2.00 \times 10^3$ | | $2.00 \times 10^3$ | | $2.00 \times 10^3$ | | $2.00 \times 10^3$ | | $2.00 \times 10^3$ | |
| | Residence time, min | 60 | | 60 | | 60 | | 60 | | 60 | |
| Third vertical stirring polymerizer | Temperature, ° C. | 270 | | 270 | | 270 | | 270 | | 270 | |
| | Pressure, Pa | 66.7 | | 66.7 | | 66.7 | | 66.7 | | 66.7 | |
| | Residence time, min | 60 | | 60 | | 60 | | 60 | | 60 | |
| Fourth horizontal stirring polymerizer | Temperature, ° C. | 285 | | 285 | | 285 | | 285 | | 285 | |
| | Pressure, Pa | 66.7 | | 66.7 | | 66.7 | | 66.7 | | 66.7 | |
| | Residence time, min | 60 | | 60 | | 60 | | 60 | | 75 | |
| Mw/Mn | | 2.9 | | 3 | | 3.3 | | 3.55 | | 2.9 | |
| Mv | | 24,500 | | 22,500 | | 26,500 | | 28,500 | | 24,300 | |
| Mn' | | 11,950 | | 11,920 | | 12,500 | | 12,950 | | 12,150 | |
| Mv/Mn' | | 2.05 | | 2.06 | | 2.12 | | 2.2 | | 2.03 | |
| p | | 0.979 | | 0.979 | | 0.980 | | 0.980 | | 0.979 | |
| Degree of branching: (mol %) | Measuring method | (A) | (B) | (A) | (B) | (A) | (B) | (A) | (B) | (A) | (B) |
| | Structural units of formula (3) | 0.264 | 0.120 | 0.275 | 0.125 | 0.374 | 0.170 | 0.440 | 0.200 | 0.260 | 0.118 |
| | Structural units of formula (4) | 0.060 | 0.040 | 0.068 | 0.045 | 0.105 | 0.070 | 0.135 | 0.090 | 0.057 | 0.038 |
| | Structural units of formula (5) | 0.017 | 0.010 | 0.020 | 0.012 | 0.051 | 0.030 | 0.085 | 0.050 | 0.017 | 0.010 |
| | Structural units of formula (6) | 0.017 | 0.010 | 0.020 | 0.012 | 0.051 | 0.030 | 0.085 | 0.050 | 0.017 | 0.010 |
| | Sum of branched structural units | 0.358 | 0.180 | 0.383 | 0.194 | 0.539 | 0.300 | 0.745 | 0.390 | 0.351 | 0.176 |
| α | | 0.0754 | | 0.0801 | | 0.114 | | 0.156 | | 0.0751 | |
| MVR-R | (g/min)/(g/min) | 17 | | 18 | | 24.5 | | 29.5 | | 16.7 | |
| Hue | YI | 1.2 | | 1.15 | | 1.35 | | 1.51 | | 1.25 | |
| Melt tension | mN | 71 | | 62 | | 115 | | 130 | | 70 | |
| Suitability for blow molding | | good | | good | | good | | good | | good | |

| | | Example 6 | Comparative Example 1 | Comparative Example 2 | Comparative Example 3 | Comparative Example 4 |
|---|---|---|---|---|---|---|
| Catalyst | Kind | $K_2CO_3$ | $Cs_2CO_3$ | $Cs_2CO_3$ | $Cs_2CO_3$ | $Cs_2CO_3$ |
| | Concentration (μmol/BPA-mol) | 0.6 | 0.4 | 0.3 | 3.5 | 3 |
| | Alkali metal concentration (μmol/BPA-mol) | 1.2 | 0.8 | 0.6 | 7 | 6 |
| First vertical stirring polymerizer | Temperature, ° C. | 220 | 220 | 220 | 220 | 220 |
| | Pressure, Pa | $1.33 \times 10^4$ | $1.33 \times 10^4$ | $1.33 \times 10^4$ | $1.33 \times 10^4$ | $1.33 \times 10^4$ |
| | Residence time, min | 60 | 60 | 60 | 60 | 60 |
| Second vertical stirring polymerizer | Temperature, ° C. | 240 | 240 | 240 | 240 | 240 |
| | Pressure, Pa | $2.00 \times 10^3$ | $2.00 \times 10^3$ | $2.00 \times 10^3$ | $2.00 \times 10^3$ | $2.00 \times 10^3$ |
| | Residence time, min | 60 | 60 | 60 | 60 | 60 |
| Third vertical stirring polymerizer | Temperature, ° C. | 270 | 270 | 270 | 270 | 270 |
| | Pressure, Pa | 66.7 | 66.7 | 66.7 | 66.7 | 66.7 |
| | Residence time, min | 60 | 60 | 60 | 60 | 60 |
| Fourth horizontal stirring polymerizer | Temperature, ° C. | 285 | 305 | 305 | 285 | 275 |
| | Pressure, Pa | 66.7 | 67.0 | 50.0 | 400.0 | 66.7 |
| | Residence time, min | 60 | 60 | 160 | 60 | 60 |

TABLE 1-continued

| | | | | | | | | | | |
|---|---|---|---|---|---|---|---|---|---|---|
| Mw/Mn | | 2.9 | | 2.7 | | 2.5 | | 4.75 | | 4.6 |
| Mv | | 24,600 | | 24,400 | | 22,000 | | 24,700 | | 22,000 |
| Mn' | | 12,000 | | 14,350 | | 14,200 | | 6,590 | | 6,100 |
| Mv/Mn' | | 2.05 | | 1.7 | | 1.55 | | 3.75 | | 3.6 |
| p | | 0.979 | | 0.982 | | 0.980 | | 0.982 | | 0.980 |
| Degree of | Measuring method | (A) | (B) | (A) | (B) | (A) | (B) | (A) | (B) | (A) | (B) |
| branching: | Structural units of formula (3) | 0.268 | 0.122 | 0.095 | 0.043 | 0.088 | 0.040 | 0.550 | 0.250 | 0.440 | 0.200 |
| (mol %) | Structural units of formula (4) | 0.060 | 0.040 | 0.009 | 0.006 | 0.008 | 0.005 | 0.180 | 0.120 | 0.135 | 0.090 |
| | Structural units of formula (5) | 0.019 | 0.011 | 0.003 | 0.002 | 0.002 | 0.001 | 0.306 | 0.180 | 0.272 | 0.160 |
| | Structural units of formula (6) | 0.019 | 0.011 | 0.003 | 0.002 | 0.002 | 0.001 | 0.306 | 0.180 | 0.272 | 0.160 |
| | Sum of branched structural units | 0.366 | 0.184 | 0.110 | 0.053 | 0.099 | 0.047 | 1.342 | 0.730 | 1.119 | 0.610 |
| $\alpha$ | | 0.0772 | | 0.0295 | | 0.0238 | | 0.2660 | | 0.2098 |
| MVR-R | (g/min)/(g/min) | 17.2 | | 12.2 | | 11.1 | | 48 | | 46 |
| Hue | Yl | 1.25 | | 2.71 | | 2.5 | | 4.5 | | 3.9 |
| Melt tension | mN | 73 | | 28 | | 21 | | 171 | | 155 |
| Suitability for blow molding | | good | | poor | | poor | | poor | | poor |

\* Measuring method (A): Determined from the molar extinction coefficients of the compounds of formulae (3) to (6).
Measuring method (B): Determined from the molar extinction coefficient of BPA (simple method).

Examples 7 to 11

Aromatic polycarbonates were produced in the same manner as in Example 1, except that polymerization was conducted under the conditions shown in Table 2 and that after the addition of butyl p-toluenesulfonate to the twin-screw extruder, a colorant and 0.01% by weight tris(2,4-di-t-butylphenyl)phosphite (Adeka Stab 2112, manufactured by Asahi Denka K. K.) as a phosphorus compound stabilizer were added to the twin-screw extruder. The results are shown in Table 2.

TABLE 2

| | | Example 7 | Example 8 | Example 9 | Example 10 | Example 11 |
|---|---|---|---|---|---|---|
| Catalyst | Kind | $Cs_2CO_3$ | $Cs_2CO_3$ | $Cs_2CO_3$ | $Cs_2CO_3$ | $Cs_2CO_3$ |
| | Concentration, μmol/BPA-mol | 0.8 | 0.8 | 0.8 | 0.8 | 2 |
| | Alkali metal concentration, μmol/BPA-mol | 1.6 | 1.6 | 1.6 | 1.6 | 4 |
| DPC/BPA molar ratio | | 1.040 | 1.040 | 1.050 | 1.050 | 1.030 |
| First vertical | Temperature, °C. | 220 | 220 | 220 | 220 | 220 |
| stirring polymerizer | Pressure, Pa | $1.33 \times 10^4$ | $1.33 \times 10^5$ | $1.33 \times 10^5$ | $1.33 \times 10^5$ | $1.33 \times 10^5$ |
| | Residence time, min | 60 | 60 | 60 | 60 | 60 |
| Second vertical | Temperature, °C. | 240 | 240 | 240 | 240 | 240 |
| stirring polymerizer | Pressure, Pa | $2.00 \times 10^3$ | $2.00 \times 10^4$ | $2.00 \times 10^4$ | $2.00 \times 10^4$ | $2.00 \times 10^4$ |
| | Residence time, min | 60 | 60 | 60 | 60 | 60 |
| Third vertical | Temperature, °C. | 270 | 270 | 270 | 270 | 270 |
| stirring polymerizer | Pressure, Pa | 66.7 | 66.7 | 66.7 | 66.7 | 66.7 |
| | Residence time, min | 60 | 60 | 60 | 60 | 60 |
| Fourth horizontal | Temperature, °C. | 285 | 285 | 285 | 285 | 285 |
| stirring polymerizer | Pressure, Pa | 66.7 | 66.7 | 66.7 | 66.7 | 150.0 |
| | Residence time, min | 60 | 60 | 60 | 60 | 60 |
| Mw/Mn | | 3.1 | 3.1 | 3.1 | 3.1 | 3.4 |
| Mv | | 25,500 | 25,500 | 25,500 | 25,500 | 23,400 |
| Mn' | | 12,260 | 12,260 | 12,260 | 12,260 | 10,880 |
| Mv/Mn' | | 2.08 | 2.08 | 2.08 | 2.08 | 2.15 |
| p | | 0.979 | 0.979 | 0.979 | 0.979 | 0.977 |
| Degree of | Measuring method | (A) (B) | (A) (B) | (A) (B) | (A) (B) | (A) (B) |
| branching: | Structural units of formula (3) | 0.290 0.132 | 0.290 0.132 | 0.290 0.132 | 0.290 0.132 | 0.408 0.185 |
| (mol %) | Structural units of formula (4) | 0.082 0.055 | 0.082 0.055 | 0.082 0.055 | 0.082 0.055 | 0.117 0.078 |
| | Structural units of formula (5) | 0.025 0.015 | 0.025 0.015 | 0.025 0.015 | 0.025 0.015 | 0.063 0.037 |
| | Structural units of formula (6) | 0.025 0.015 | 0.025 0.015 | 0.025 0.015 | 0.025 0.015 | 0.063 0.037 |
| | Sum of branched structural units | 0.422 0.216 | 0.422 0.216 | 0.422 0.216 | 0.422 0.216 | 0.651 0.338 |
| $\alpha$ | | 0.0898 | 0.0898 | 0.0898 | 0.0898 | 0.1186 |
| MVR-R | (g/min)/(g/min) | 21 | 21 | 21 | 21 | 29.3 |
| Residual DPC amount | wt.ppm | 40 | 40 | 100 | 100 | 500 |
| Terminal OH amount | wt.ppm | 900 | 900 | 500 | 500 | 300 |
| Colorant | wt.ppm | | | | | |
| Phthalocyanine Blue | | 0 | 0 | 20 | 0 | 20 |
| Anthraquinone dye | | 0 | 5 | 0 | 0 | 0 |
| Ultramarine | | 0 | 0 | 0 | 200 | 0 |
| Hue | Yl | 1.25 | −2.9 | −30.9 | −29.8 | 1.47 |
| HAZE | Before hydrolysis test (%) | 1 | 1 | 1 | 6 | 1 |
| | After hydrolysis test (%) | 3 | 3 | 3 | 27 | — |

TABLE 2-continued

|  |  | Example 7 | Example 8 | Example 9 | Example 10 | Example 11 |
|---|---|---|---|---|---|---|
| Melt tension | mN | 80 | 80 | 80 | 80 | 93 |
| Suitability for blow molding |  | good | good | good | good | good |
| Bottle falling test |  | ○ | ○ | ○ | ○ | X |
| Odor |  | ○ | ○ | ○ | X | X |

\* Measuring method (A): Determined from the molar extinction coefficients of the compounds of formulae (3) to (6).
Measuring method (B): Determined from the molar extinction coefficient of BPA (simple method).
Phthalocyanine Blue: CROMOPHTAL Blue 4GNP (manufactured by Ciba Specialty Chemicals Co.)
Anthraquinone dye: MACROLEX VIOLET 3R (manufactured by BAYER)
Ultramarine: No. 3000 (manufactured by Daiichi Kasei Kogyo Co., Ltd.) treated with silicone While the invention has been described in detail and with reference to specific embodiments thereof, it will be apparent to one skilled in the art that various changes and modifications can be made therein without departing from the spirit and scope thereof.

This application is based on a Japanese patent application filed on Apr. 22, 2002 (Application No. 2002-119514) and a Japanese patent application filed on Nov. 20, 2002 (Application No. 2002-337099), the contents thereof being herein incorporated by reference.

<Industrial Applicability>

According to the invention, the aromatic polycarbonate has improved flowability under high load and a satisfactory hue. The polycarbonate is hence suitable for use in processing by extrusion and injection molding, especially in applications such as hollow parts formed by blow molding, which necessitates a material having high melt strength and giving an extrudate with excellent shape retention, large panels, and sheets formed by profile extrusion.

The invention claimed is:

1. An aromatic polycarbonate having a viscosity-average molecular weight of 16,000 or higher that is obtained by the transesterification method, wherein the ratio of the weight-average molecular weight (Mw) to number-average molecular weight (Mn), as measured by gel permeation chromatography and calculated for standard polystyrene (Mw/Mn) of the aromatic polycarbonate, is in the range of from 2.8 to 4.5 and wherein the proportion of the number of moles of all branched structural units to 1 mol of structural units represented by formula (1) is higher than 0.3 mol % and not higher than 0.95 mol %:

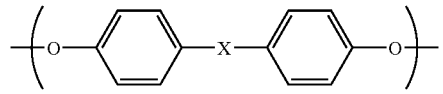

wherein X is a member selected from the group consisting of a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms and bivalent group selected from the group consisting of —O—, —S—, —CO—, —SO—, and —SO$_2$—.

2. An aromatic polycarbonate having a viscosity-average molecular weight of 16,000 or higher that is obtained by the transesterification method, wherein the ratio of the viscosity-average molecular weight (Mv) calculated using the following formula (2) to the number-average molecular weight (Mn') calculated from the number of all molecular ends (Mv/Mn') of the aromatic polycarbonate is in the range of from 1.8 to 3.5 and wherein the proportion of the number of moles of all branched structural units to 1 mol of structural units represented by formula (1) is higher than 0.3 mol % and not higher than 0.95 mol %:

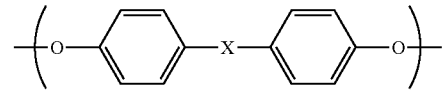

$\eta_{sp}/C = [\eta] \times (1 + 0.28\eta_{sp})$ $[\eta] = 1.23 \times 10^{-4} \times (Mv)^{0.83}$     formula (2)

wherein $\eta_{sp}$ is the specific viscosity of a methylene chloride solution of the polycarbonate resin as measured at 20° C. and C is the concentration of this methylene chloride solution, the methylene chloride solution being one having a polycarbonate resin concentration of 0.6 g/dl.

3. The aromatic polycarbonate as claimed in claim 1, wherein the branched structural units are represented by formulae (3) to (6):

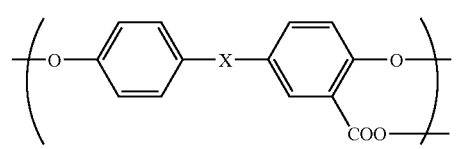

formula (3)

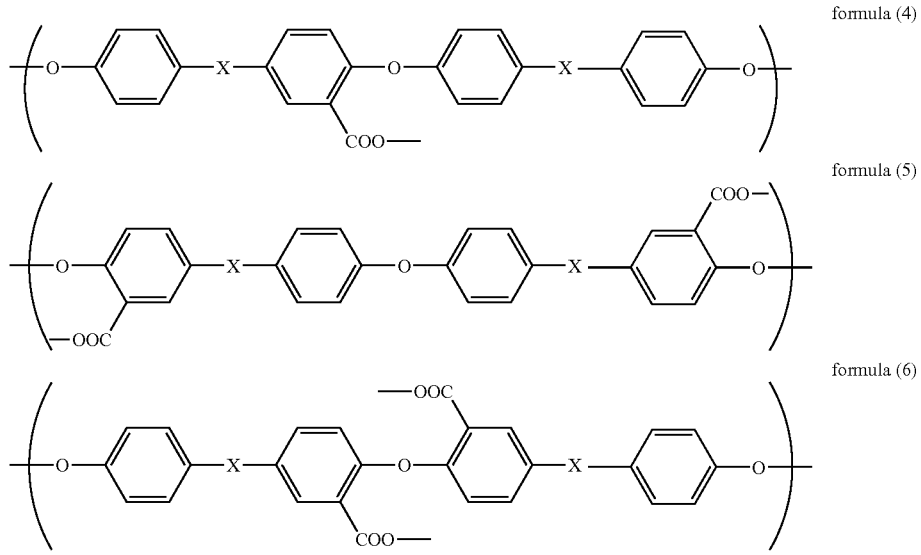

wherein X is a member selected from the group consisting of a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms and bivalent group selected from the group consisting of —O—, —S—, —CO—, —SO— and —SO$_2$—.

4. The aromatic polycarbonate as claimed in claim 1, wherein the aromatic polycarbonate is a branched aromatic polycarbonate whose structure is characterized by the value of α in the following formula (7) which is in the range of 0.03 to 0.3:

$$\alpha = p^2 \rho / [1 - p^2(1-\rho)] \qquad \text{formula (7)}$$

wherein α represents the probability that a molecular end is a branched unit; p represents the probability that n repeating units are yielded; and ρ represents the number of branched units.

5. The aromatic polycarbonate as claimed in claim 4, wherein the value represented by the α ranges from 0.05 to 0.2.

6. The aromatic polycarbonate as claimed in claim 5, wherein the value represented by α ranges from 0.06 to 0.15.

7. The aromatic polycarbonate as claimed in claim 1, which is an aromatic polycarbonate having a viscosity-average molecular weight of 24,000 or higher.

8. The aromatic polycarbonate as claimed in claim 1, which has a flow rate ratio (MVR-R), as represented by the following formula (8) and determined in accordance with JIS K 7210, in the range of 15 to 45.

$$MVR\text{-}R = MVR(21.6)/MVR(2.16) \qquad \text{formula (8)}$$

9. The aromatic polycarbonate as claimed in claim 1, wherein the proportion of the number of moles of the branched structural units represented by formula (5) to 1 mol of the structural units represented by formula (1) ranges from 0.0001 to 0.15 mol %.

10. The aromatic polycarbonate as claimed in claim 1, wherein the proportion of the number of moles of the branched structural units represented by formula (6) to 1 mol of the structural units represented by formula (1) ranges from 0.0001 to 0.15 mol %.

11. A process for producing the aromatic polycarbonate as claimed in claim 1 by reacting one or more carbonic diesters with one or more aromatic dihydroxy compounds, wherein the aromatic polycarbonate is prepared by the action of at least one alkali metal compound and/or at least one alkaline earth metal compound in an amount of from 1.1 to 6 μmol in terms of metal content per mole of the aromatic dihydroxy compounds.

12. The process for aromatic-polycarbonate production as claimed in claim 11, wherein the amount of the alkali metal compound and/or alkaline earth metal compound ranges from 1.3 to 3.8 μmol in terms of metal content per mole of the aromatic dihydroxy compounds.

13. The process for aromatic-polycarbonate production as claimed in claim 11, wherein the process is a process for producing a branched aromatic polycarbonate which comprises the step of conducting polymerization in at least two polymerizers, and wherein the final polymerizer is of the horizontal type and the reaction temperature in the final polymerizer is in the range of 280 to 300° C.

14. An aromatic polycarbonate composition which comprises the aromatic polycarbonate as claimed in claim 1 and a carbonic diester compound, wherein the content of the carbonic diester compound is 200 ppm by weight or lower.

15. An aromatic polycarbonate composition which comprises the aromatic polycarbonate as claimed in claim 1 and a dye, wherein the dye comprises one or more compounds selected from Phthalocyanine Blue dyes and anthraquinone dyes, the content of the dye being from 0.01 ppm by weight to 100 ppm by weight.

16. A hollow container obtained by the blow molding of the aromatic polycarbonate as claimed in claim 1.

17. A hollow container obtained by the blow molding of the aromatic polycarbonate composition as claimed in claim 14.

18. The hollow container as claimed in claim 16, which is a bottle for a dairy product, a bottle for a refreshing beverage, or a bottle for water.

19. The process for aromatic-polycarbonate production as claimed in claim 12, wherein the process is for the production of a branched aromatic polycarbonate which comprises the step of conducting polymerization in at least two polymerizers, and wherein the final polymerizer is of the horizontal type and the reaction temperature in the final polymerizer is in the range of 280 to 300° C.

20. A hollow container obtained by the blow molding of the aromatic polycarbonate composition as claimed in claim 15.

21. The hollow container as claimed in claim 17, which is a bottle for a dairy product, a bottle for a refreshing beverage, or a bottle for water.

\* \* \* \* \*